United States Patent [19]

Scarfe

[11] Patent Number: 4,622,678
[45] Date of Patent: Nov. 11, 1986

[54] ELECTRICALLY HEATED FOREHEARTH

[75] Inventor: Frederick Scarfe, Benfleet, United Kingdom

[73] Assignee: Electroglass Limited, United Kingdom

[21] Appl. No.: 749,445

[22] Filed: Jun. 27, 1985

[30] Foreign Application Priority Data

Jul. 5, 1984 [GB] United Kingdom ............... 8417117
Apr. 2, 1985 [GB] United Kingdom ............... 8508566

[51] Int. Cl.$^4$ ............................................. C03B 18/18
[52] U.S. Cl. ................................... 373/134; 266/242; 266/286; 266/200; 65/356; 65/347
[58] Field of Search ............ 266/200, 280, 286, 283, 266/275, 242, 900; 501/95; 65/347, 346, 356, 374.13, 337; 373/130, 117, 134

[56] References Cited

U.S. PATENT DOCUMENTS

| | | | |
|---|---|---|---|
| 3,700,224 | 10/1972 | Nölting | 266/200 |
| 3,725,045 | 4/1973 | Roblin et al. | 266/200 |
| 4,321,035 | 3/1982 | Takashima | 266/286 |

FOREIGN PATENT DOCUMENTS

| | | |
|---|---|---|
| 921551 | 5/1947 | France . |
| 1526684 | 9/1978 | United Kingdom . |
| 2139210 | 5/1983 | United Kingdom . |

Primary Examiner—L. Dewayne Rutledge
Assistant Examiner—S. Kastler
Attorney, Agent, or Firm—Bacon & Thomas

[57] ABSTRACT

A forehearth having a delivery channel 2 for a molten liquid (e.g. glass) 1, provided with a channel ceiling 11 of an insulating refractory ceramic fibre material and with electrical heating means 6, is capable of greatly increased efficiency in energy usage relative to conventional gas-fired forehearths.

6 Claims, 7 Drawing Figures

ELECTRICALLY HEATED FOREHEARTH

This invention relates to forehearths, in particular to forehearths provided with electrical heating means.

Forehearths are used, particularly in glass production, as heated conduits through which molten fluid, e.g. glass or metal, may flow to forming apparatus.

In general, a forehearth comprises a channel resistant to the molten fluid and provided with heating means, such as gas burners arranged above and along the sides of the channel, to maintain the fluid in its molten state and to bring it to the correct temperature for delivery to the forming apparatus.

With conventional gas-heated forehearths it is generally necessary to provide cooling means, such as a forced cold air-flow, to prevent the molten fluid e.g. glass, in the delivery channel from overheating or to condition the fluid to the desired outlet temperature. The cooling means are required since the gas supply to the burners cannot be reduced significantly without causing serious non-uniformity of the radiative heating of the fluid in the channel and/or causing the burner flames to cut out with the consequent risk of explosion. Non-uniformity of radiative heating arises as the gas supply is reduced since the flame length is also reduced and maximum temperature sections of the refractive channel ceiling move towards the burners which are generally arranged along the channel sides. Thus the use of such forehearths involves a high energy wastage.

We have now found that a reduction in forehearth energy expenditure by up to about 93% can be achieved by the use of the combination of ceramic fibre based refractive insulating material for the channel ceiling and of electrical heating for the forehearth delivery channel.

According to one aspect of the present invention we thus provide a forehearth having a molten liquid delivery channel, e.g. a molten glass delivery channel, with disposed thereover (a) a channel ceiling member of insulating refractory ceramic fibre material and (b) an electrical heating means arranged to heat molten fluid travelling along said channel.

The refractory ceramic fibre based insulating material from which the delivery channel ceiling, or at least that part of the channel roof that faces into the channel, is formed is generally unsuitable for use with conventional gas burners since the air turbulance resulting from the flame jets causes the fibrous insulating material to be eroded. Furthermore, using electrical heating means a particular uniformity in roof and/or molten liquid temperature can be maintained even when the heat output of the heating means is increased or decreased. Thus it becomes no longer essential to provide the forehearth with the forced draught cold air inlets required in conventional forehearths.

If it is desired, the heating means in the forehearth of the invention may be adapted to provide regions of greater or lesser heating effect to increase the uniformity of molten liquid temperature across the channel. In general, the molten liquid in the forehearth delivery channel will be cooler towards the channel sides and the heating means is adapted to provide a greater heating effect at the channel sides. Forehearths provided with such novel adapted heating means are also described herein.

Particularly suitably, the electrical heating means in the forehearth of the invention may be in the form of a plurality of heating elements such as tubes or rods of an electrically conductive material, e.g. silicon carbide. To create a region of enhanced heating effect in such tubes, an elongate aperture, for example a helical cut, may be formed along the tube surface to reduce the cross-sectional area of the path through which electrical current may flow along the tube and thus increase electrical resistance and the heating effect in the apertured section of the tube. A heating element with "hot" regions, i.e. regions of enhanced heating effect, on either side of a central "cold" region may thus take the form of a tubular element having helical apertures in the tube surface on either side of a central tube portion in which either no helical aperture appears or in which the helix frequency (i.e. the number of turns per unit length) is reduced.

Where a sharp distinction between "hot" and "cold" regions is not desired, the helix frequency can be varied gradually to be greater in those regions requiring greater heating. Alternatively regions of enhanced heating effect can be achieved by reducing the cross-sectional area of the silicon carbide tube or rod in the areas where enhanced heating is required. Again the changeover to areas of reduced cross-sectional area (the "hot" regions) may be gradual or sharp.

As a further alternative "hot" and "cold" regions of the heating element may be achieved by varying the chemical composition along the element to achieve a variation in resistivity.

Electrical heating elements having different relative lengths of the "hot" and "cold" regions can thus readily be formed thereby allowing a great variation in the preferential heating effects to be achieved. Thus for example in certain forehearths the extra heating required at the channel sides is asymmetric. In such cases heating elements having suitably asymmetric regions of enhanced heating effect can be employed.

It is particularly preferred however that the heating elements used in the forehearths of the invention shall have the same overall resistance as and so be readily interchangeable with standard heating elements of uniform heating effect.

The forehearths of the invention may comprise several electrical heating elements disposed above and extending across at least a major part of the molten liquid delivery channel. The successive heating elements underneath which the molten fluid passes as it moves along the channel may be elements providing uniform heating effect along their length or, if preferential channel side heating is desired, some or all may have the same or different relative hot and cold regions according to the extent of preferential channel side heating required. A preferred arrangement of preferential electrical heating elements however is one in which the relative size of the central cold region increases along the direction of flow of the fluid to enable the cooling at the channel sides to be tackled more vigorously as the fluid approaches the forehearth outlet or spout.

The regions of preferential heating in the forehearths of the invention may be well defined and do not vary with the current passing through the heating elements. This contrasts with the heating effect of gas burners in conventional forehearths where with a reduction in gas supply the flame lengths shorten and the most radiant regions of the refractory ceiling to the channel move towards the channel sides.

A further advantage of the use according to the invention of electrical heating elements rather than gas heating in forehearths is that it permits the refractory ceiling to the channel to be positioned at a lower height above the channel thus allowing the "hot" regions of the ceiling to have a more localised heating effect on the fluid in the channel below. The ceramic fibre material used for the ceiling member in the forehearths of the invention is preferably light-weight and suitably is such as to be capable of withstanding temperatures of up to 1300° C. and preferably up to at least 1500° C. The fibres may be of any ceramic material capable of withstanding these temperatures but preferably are of alumina or zirconia, optionally in admixture with silica.

Preferably the ceiling member has a density of 0.1 to 0.5, especially preferably about 0.25, g/cm³ and comprises alumina fibres vacuum formed with a binder. Such a material is commercially available as "1600 grade board". Such lightweight ceramic fibre materials allow a channel ceiling to be constructed with a thermal mass of as low as about 10% of that of the conventional gas heated forehearths. This reduction in thermal mass permits much faster response speeds and allows a greater precision in temperature control. In turn this allows glass of increased temperature uniformity to be delivered to the forming apparatus.

As the weight of glass is closely related to its temperature on delivery to the forming apparatus, improved temperature control results in improved product weight control and a lower rate of rejection of products for being overweight or underweight.

Preferred embodiments of the present invention will now be described by way of example and with reference to the accompanying drawings, in which.

Figure 1:
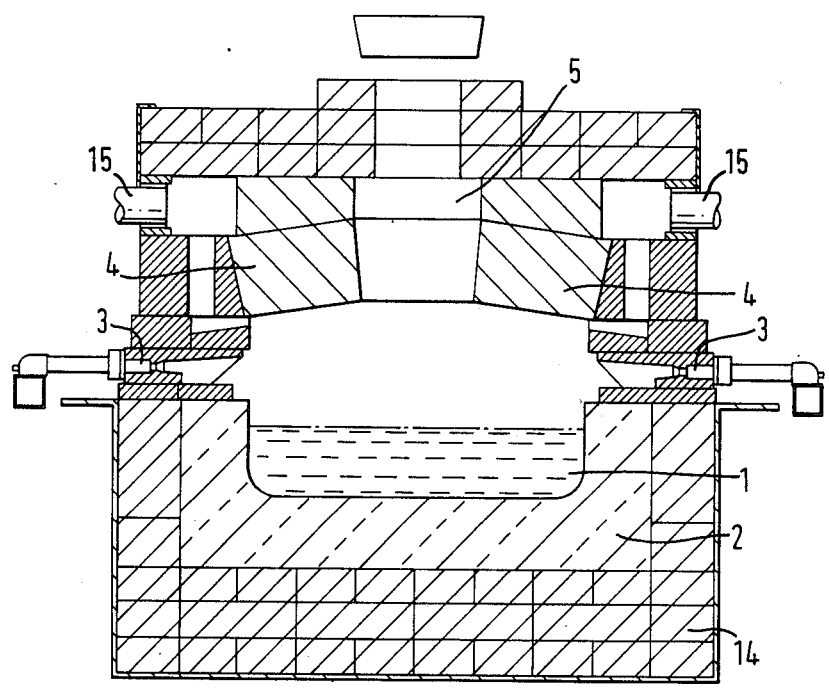
FIG. 1 is a cross-sectional view of a conventional gas heated forehearth.

Referring to FIG. 1, molten glass 1, generally at a temperature of 1050° to 1300° C., flowing along channel 2 (in the out of plane direction) is heated by gas burners 3 which cause the refractory material of channel ceiling 4 to radiate heat down onto the glass. Forced draught cold air inlet ducts 15 and vent 5 are provided in channel ceiling 4 to permit cooling of the glass.

Figure 2A:
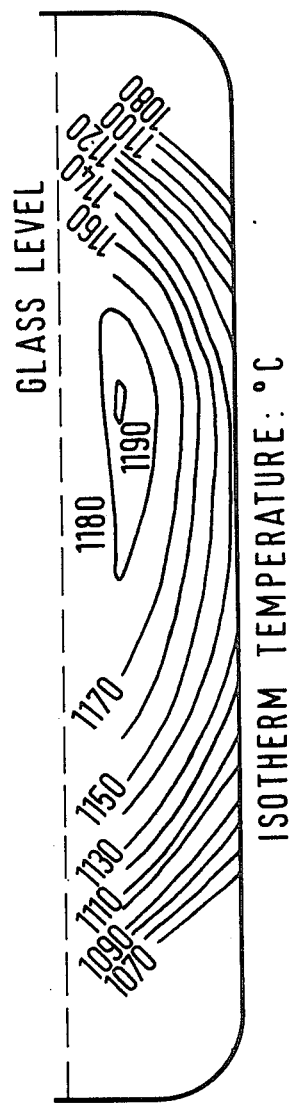
FIGS. 2A and 2B are schematic cross-sections, showing isotherms, through molten glass streams in forehearth channels.
Figure 2B:
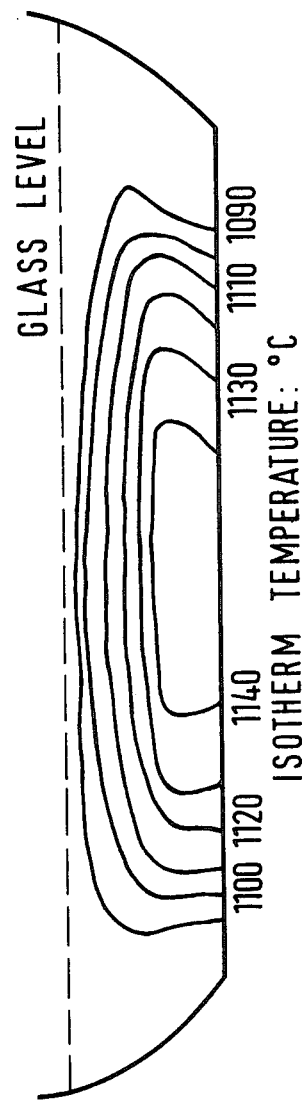

FIGS. 2A and 2B are provided to show the degree of temperature inhomogeneity across the glass streams in the channels of conventional gas-heated forehearths at positions close to the outlets of the channels into the forming apparatus.

Figure 3:
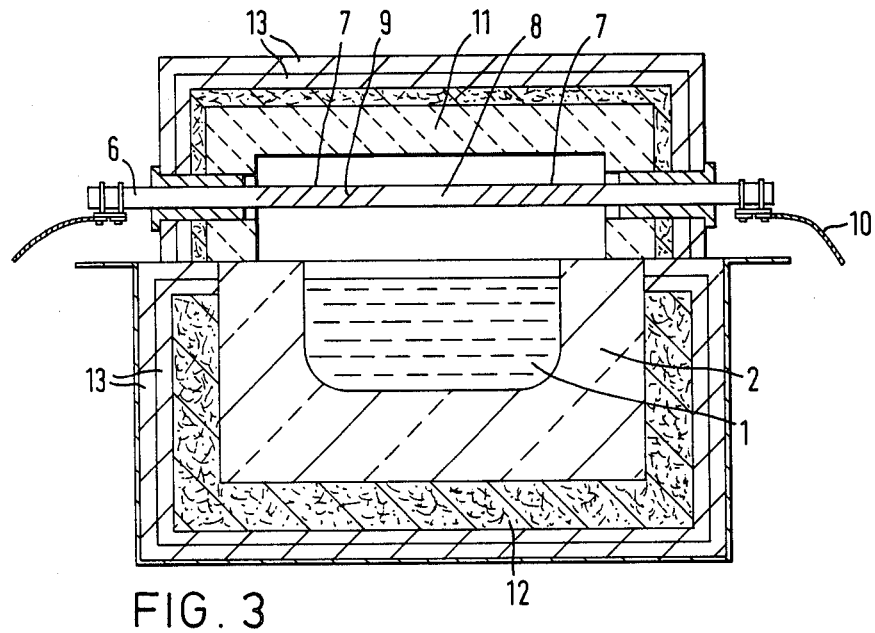
FIG. 3 is a cross-sectional view of a forehearth according to the present invention.

In FIG. 3, electrical heating element 6 is shown extending across channel 2. Element 6 has "hot" regions 7 about a central "cold" region 8. The element 6 is in the form of a silicon carbide tube with helical apertures 9 cut into its surface to provide the "hot" regions. Electrical current to the element 6 is supplied through flexible braids 10 electrically connected to sections of the element which protrude out through the walls of the forehearth.

The channel is suitably formed of MULLITE, a refractory glass contact material which is commonly used in forehearths and glass furnaces and is resistant to glass attack.

The channel ceiling 11 is formed of a ceramic fibre board, which suitably has a density of about 0.27 g/cm³ (as compared with the 2.5 g/cm³ density of MULLITE). This material is preferably made from pure alumina fibres which, together with a binder, are vacuum formed into boards. Board available as 1600 grade board is particularly suitable.

The channel 2 and the channel ceiling 11 are provided with insulating backing layers 12 in the form of ceramic fibre boards, such as those discussed above, or blankets of ceramic fibre material. The blankets are also of low density and may conveniently be made from a mixture of silica and alumina fibres, particularly preferably blankets of 0.096 g/cm³ density and having maximum service temperatures of about 1250° C.

The backing layers 12 are themselves provided with further insulating layers 13 of a microcellular silica material such as that obtainable under the trade name MICORTHERM.

Figure 4:
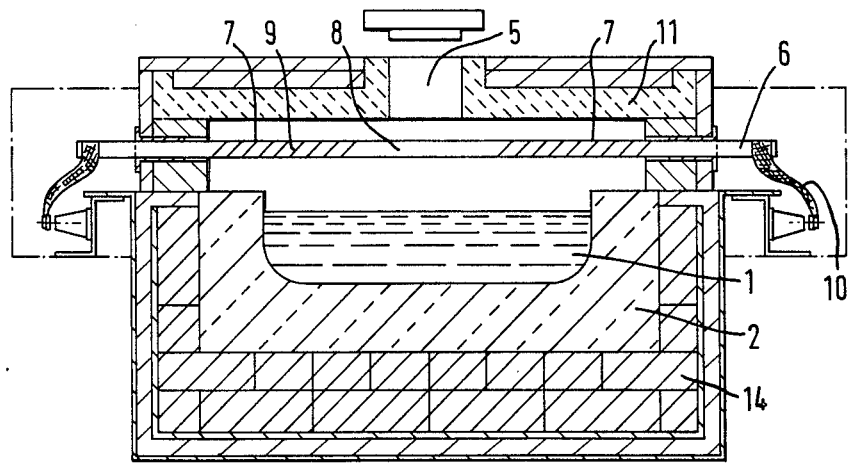
FIG. 4 is a cross-sectional view of an alternative construction of a forehearth according to the present invention.

In the alternative embodiment shown in FIG. 4, channel 2 is shown as having conventional forehearth insulation 14 and channel ceiling 11 is shown provided with a vent 5.

The channel ceiling is preferably of such insulative quality as to enable the ceiling exterior to be touched even when glass at temperatures of e.g. 1250° C. is flowing along the channel. This is achievable with ceiling thicknesses of as little as 7.5 cm. With the use of such ceiling members and electrical heating elements, the total energy usage of a glass forehearth according to the invention may be as low as 7% of that of a comparable gas heated forehearth.

Figure 5:
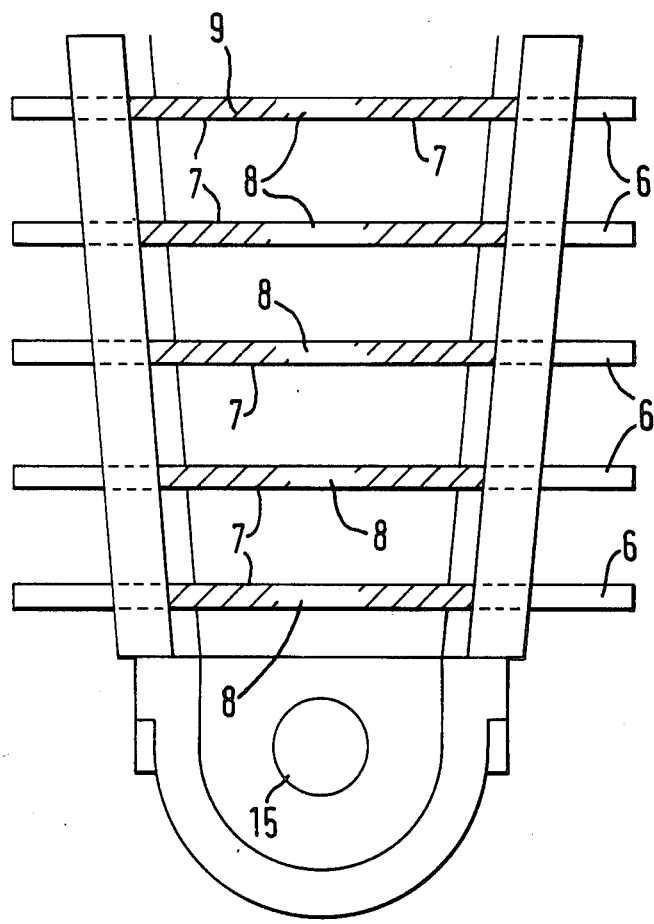
FIG. 5 is a schematic plan view of a forehearth according to the present invention with the channel ceiling removed.
Figure 6:
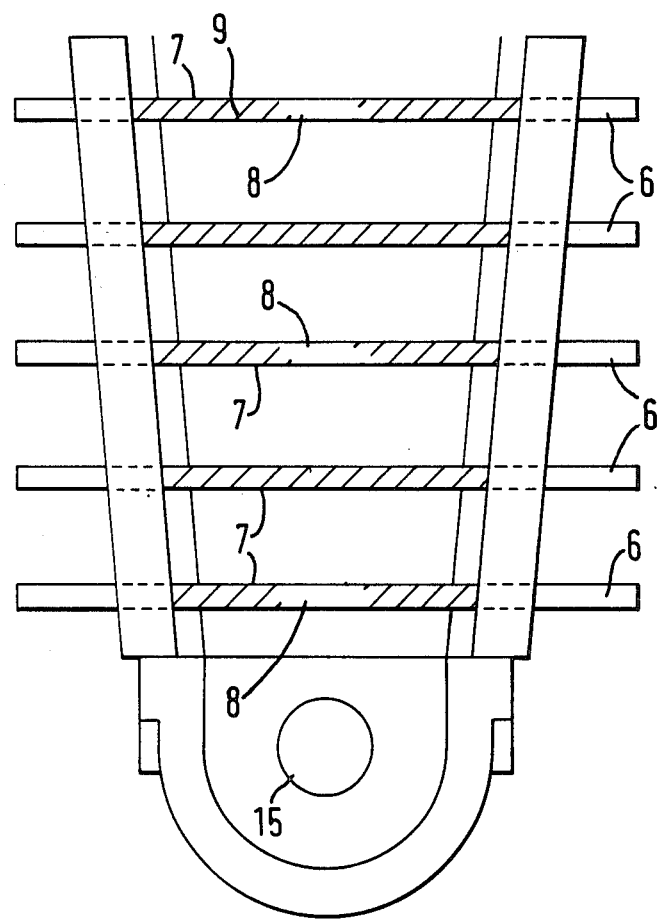
FIG. 6 is a schematic plan view of a further forehearth according to the present invention also with the channel ceiling removed and showing an alternative arrangement of the heating elements.

FIGS. 5 and 6 show embodiments of the forehearth of the invention with channel ceiling 11 removed. Molten glass flows along channel 2 towards spout 15 below the electrical heating elements 6. In the embodiment shown in FIG. 5, the central "cold" regions of elements 6 becomes successively wider towards spout 15 to enable cooling at the channel sides to be tackled more vigorously. In the alternative embodiment shown in FIG. 6, heating elements having a central "cold" region alternative with heating elements of uniform heating effect; in this embodiment, the uniform and non-uniform heating elements can be controlled separately and, by varying the relative power supply to the two sets of heating elements, the preferential channel side heating effect can be varied as required.

While the present invention has been described in terms of forehearths for molten liquids it should be realised that delivery channels constructed in accordance with the present invention may be suitable in processes where constant heating across the delivery channel is required e.g. in the reheating of billets or partially formed metal sections. Such delivery channels are deemed also to fall within the scope of the present invention.

I claim:

1. A forehearth having a molten liquid delivery channel with disposed thereover (a) a channel ceiling member of insulating refractory ceramic fibre material and (b) a plurality of electrical heating elements arranged transverse to the flow direction of the molten liquid in said channel, the cross-sectional area of the electrical path in at least one of said elements being reduced on either side of a central portion of said element whereby to provide a greater heating effect from said element towards the sides than towards the centre of said delivery channel.

2. A forehearth as claimed in claim 1 comprising a molten glass delivery channel with arranged thereover said plurality of electrical heating elements, the overall electrical resistance of each said electrical heating element being substantially the same.

3. A forehearth as claimed in claim 1 wherein said electrical heating means comprises a plurality of tubular or rod-like silicon carbide heating elements.

4. A forehearth as claimed in claim 1 wherein said ceramic fibre material comprises fibres selected from the group consisting of alumina fibres and zirconia fibres.

5. A forehearth as claimed in claim 1 wherein said ceramic fibre material has a density of from 0.1 to 0.5 g cm$^{-3}$.

6. A forehearth as claimed in claim 1 wherein said channel ceiling member comprises an alumina fibre board provided with one or more insulating backing layers.

* * * * *